Figure 1:
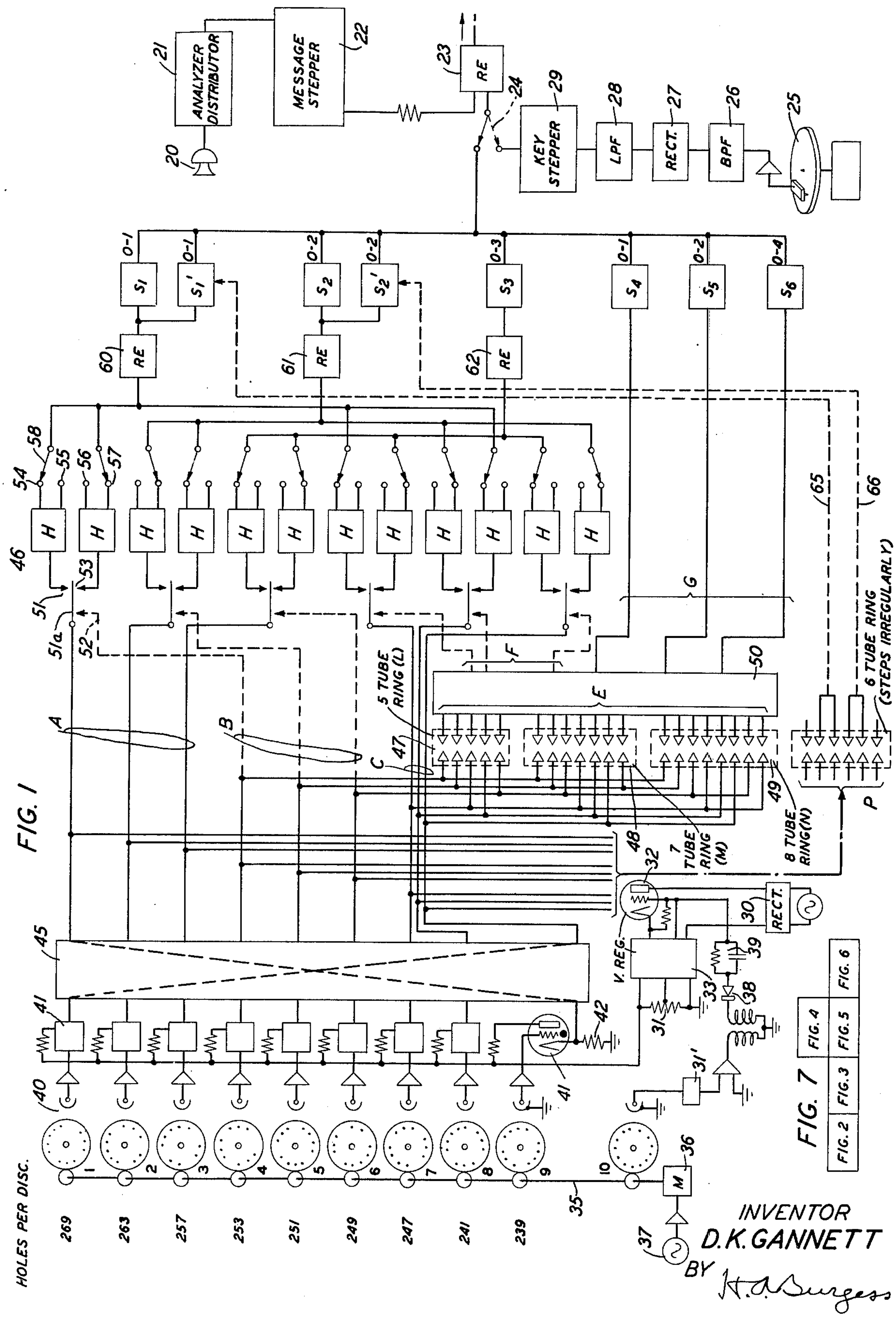

United States Patent [19]

Gannett

[11] 3,983,326

[45] Sept. 28, 1976

[54] KEY PULSE GENERATOR FOR SECRECY SIGNALLING CIRCUIT

[75] Inventor: Danforth K. Gannett, Mountain Lakes, N.J.

[73] Assignee: Bell Telephone Laboratories, Incorporated, Murray Hill, N.J.

[22] Filed: Sept. 27, 1944

[21] Appl. No.: 555,913

[52] U.S. Cl. ................................ 179/1.5 R; 178/22; 331/78; 340/357

[51] Int. Cl.$^2$ ............................................ H04L 9/04

[58] Field of Search ............ 179/1.5, 1.5 R; 178/22, 178/50, 51, 69.5; 250/27 GT, 29 PS, 36, 13.2; 331/78; 340/346, 349, 357

[56] References Cited

UNITED STATES PATENTS

| | | | |
|---|---|---|---|
| 1,369,805 | 3/1921 | Hamilton | 179/1.5 |
| 1,461,783 | 7/1923 | Parker et al. | 179/1.5 |
| 1,561,227 | 11/1925 | Griggs | 178/51 |
| 1,940,016 | 12/1933 | Ranger | 178/69.5 |
| 1,954,170 | 4/1934 | Gibbs et al. | 340/357 |
| 1,965,121 | 7/1934 | Kardorff | 340/357 |
| 2,089,639 | 8/1937 | Bedford | 250/27 |
| 2,145,332 | 1/1939 | Bedford | 307/106 |
| 2,236,705 | 4/1941 | Campbell | 250/27 |

*Primary Examiner*—Howard A. Birmiel
*Attorney, Agent, or Firm*—H. A. Burgess

EXEMPLARY CLAIM

6. In a pulse generating system, means for producing irregular pulses in each of a number of separate circuits, an output for each of said circuits, a pair of holding devices for each of said circuits, means for connecting said holding devices one at a time to their respective circuits and means for combining pulses impressed on each of said outputs from said several circuits with other pulses from a corresponding one of said holding devices.

18 Claims, 8 Drawing Figures

INVENTOR
D.K. GANNETT
BY H. A. Burgess
ATTORNEY

INVENTOR
D.K. GANNETT
BY H. A. Burgess
ATTORNEY

INVENTOR
D.K. GANNETT
BY H. A. Burgess
ATTORNEY

INVENTOR
D.K. GANNETT
BY H. A. Burgess
ATTORNEY

INVENTOR
D.K. GANNETT
BY H. A. Burgess
ATTORNEY

INVENTOR
D. K. GANNETT
BY
ATTORNEY

INVENTOR
D.K. GANNETT
BY H. A. Burgess
ATTORNEY

KEY PULSE GENERATOR FOR SECRECY SIGNALLING CIRCUIT

The present invention relates to the production of pulses having a highly irregular distribution of pulse value with time. Such pulses may be used, for example, for enciphering message currents to be secretly transmitted, it being necessary for this purpose to provide identical series of pulses at the transmitting and receiving points for, respectively, enciphering and deciphering the message. It is desirable that these series of key pulses possess a random distribution of pulse value with time and one way of making a practical approach to this ideal has been to record randomly occurring impulses on a record, making two identical key records and physically transporting one of them to the distant station.

The present invention has for its object to generate pulses having approximately random distribution with time as a function of a definite apparatus so that a duplicate apparatus located elsewhere can simultaneously generate identical pulses, thus avoiding having to transport records to provide duplicate keys at separated points.

In accordance with the invention, separate series of pulses generated by a suitable mechanism are combined in various ways changing with time so as to provide a series which never repeats itself within any period of practical use.

In the specific disclosure, the final pulses vary in steps, the steps having the values 0, 1, 2, 3, 4 and 5. The pulses occur at the rate of 500 per second in the specific example of the present disclosure, and all pulses are of equal length. The pulses are to occur with these different step values in a practically random manner.

In accordance with a feature of this invention, a mechanism is used to produce "off" and "on" (0 or 1) pulses, all the on pulses having the same step value, 1. A number of relatively short series of these pulses are used, each series repeating over and over. Each such short series is, however, of different length from all the others and the lengths of these series have no common factor. In making up the pulses to be used from these prime series of two-valued pulses, pulses from various series are added in variable manner and the sums are reentered, after which the resulting pulses are differently weighted, added and again reentered, the weighting and final reentry being such as to produce pulses having a 0 to 5 range of step values. The use of simple off-on pulses enables a series of pulses to be readily altered by auxiliary devices which determine whether any given pulses are to be used as produced or are to be inverted. Thus, in the adding of pulses from different series, either one or both series may be modified in irregular manner before they are added, thus further destroying in the summed, reentered pulses all trace of the recurrent nature of the prime series. Various such auxiliary code modifying devices can be used in combination operating in highly irregular manner with the result that the final stepped pulses form a practically endless series.

Another provision that is made in accordance with the invention is the application to the weighting devices of different biases from time to time in a discontinuous manner, thereby further adding to the indeterminacy of the eventual pulses.

The necessity that the key generating systems at separated points must produce duplicate key pulses continuously for long periods of time makes it important to provide against the persistence of small errors in either system, such as might occur if one of the devices, through some error, skipped a pulse and shifted the whole series of output pulses. This type of erros is avoided in the present invention by providing the code modifying devices with a zero position and at frequent intervals resetting them to zero. Another feature comprises the use of holding devices for holding over a pulse from the pulse period in which it is received into a later pulse period as a means for introducing further irregularity or indeterminacy into the output pulses.

Figure 8:
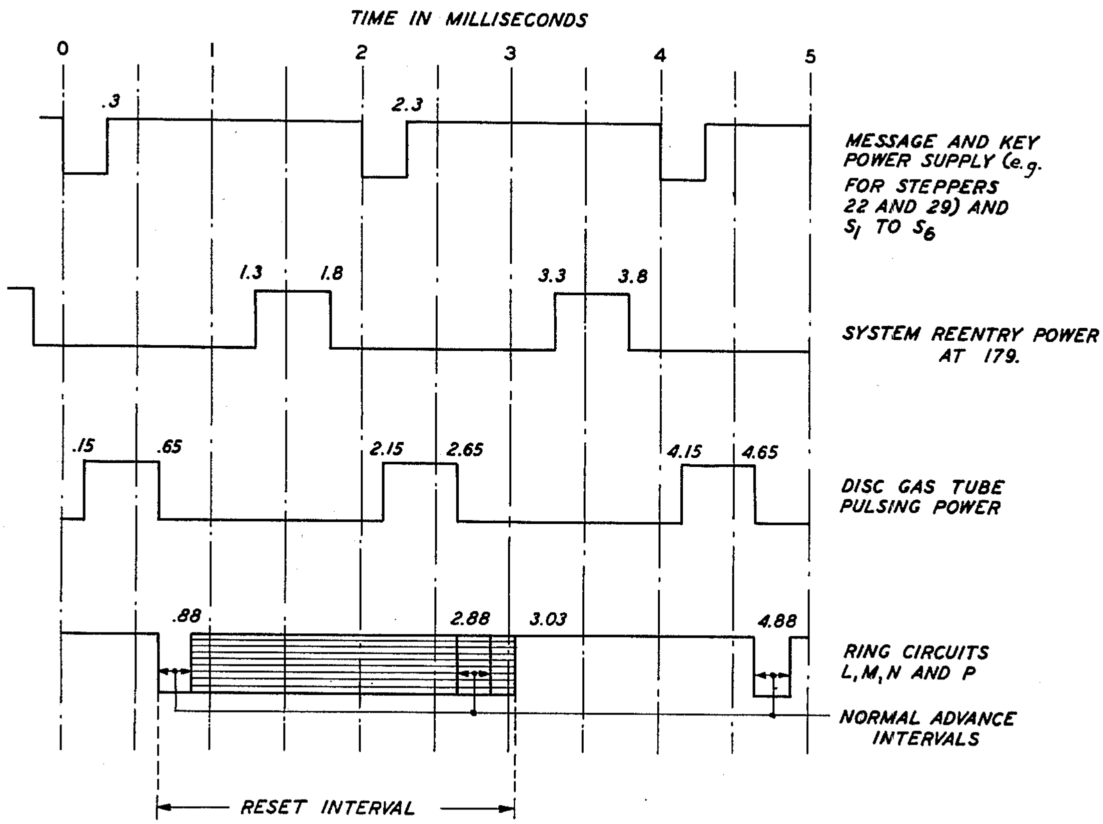

These and other features and objects of the invention will appear more clearly from the following detailed description of an illustrative embodiment shown in the accompanying drawing, in which:

FIG. 1 shows a diagrammatic layout, partly on a functional basis, of one complete code generator in accordance with the invention;

FIGS. 2, 3, 4, 5 and 6, when placed together as shown in the key FIG. 7, show in schematic circuit diagram the detail circuits of the various elements of the generator of FIG. 1; and FIG. 8 shows time relations between different parts, to be referred to in the description.

Referring to FIG. 1, most of this figure is concerned with key producing equipment but there is shown at the extreme right a portion of the transmitting circuit of a secret telephone system to indicate at what point the key pulses are fed into the system. The type of secret telephone system that is indicated may be the same as that disclosed in U.S. application of R. L. Miller Ser. No. 542,975, filed June 30, 1944. As specifically disclosed in that application the speech, which may come from a microphone 20 or telephone line, is first analyzed into a number of low frequency speech-defining waves in separate circuits or channels called vocoder channels. A rapidly operating distributor connects these channels one at a time in rapid succession to a common enciphering or keying equipment which comprises among other parts a message stepper and a reentry circuit. These are indicated respectively at 22 and 23 while the analyzer distributor is shown at 21. Also supplied to the reentry circuit 23 is a suitable key wave which in the Miller disclosure is derived from a phonograph record 25 on which it is recorded in the form of a modulated high frequency wave. The key pulses themselves occur at the rate of 500 pulses per second and vary in amplitude from pulse to pulse in a practically random manner with time. The pulses are derived by passing the waves picked up from the record successively through band-pass filter 26, rectifier 27 and low-pass filter 28 from which they are impressed on key stepper 29 which may be a duplicate of stepper 22. With the switch 24 in its lower position these key pulses are supplied to the input side of reentry circuit 23 along with the output of the message stepper. The remainder of the transmitting circuit beyond the reentry circuit 23 is not shown in FIG. 1 but may be assumed to be the same as in the Miller application disclosure.

The present invention provides an alternative to the phonograph record as a means of supplying key pulses at 500 pulses per second to the reentry circuit and in the further description it will be assumed that switch 24 is in its upper or solid line position so that these pulses are derived from the output sides of the steppers $S_1$ to $S_6$ in parallel.

The prime sources of 500-cycle off-on pulses could be of any suitable type but are disclosed as comprising a number of opaque discs 1 to 9 plus a synchronizing disc 10, shown at the left side of the figure. These discs have holes arranged in circles near their outer peripheries and in the case of each disc, means (not shown) is provided for projecting light through the holes and upon a photoelectric cell. The discs are individually mounted on stub shafts and are driven from their edges by pinions on a common shaft 35 by motor 36 which is run at constant speed under control of a standard frequency oscillator 37. Each of the discs 1 to 9 has a different arrangement of holes alternating with blank spaces and the discs differ slightly in diameter so that if every hole position were occupied by a hole, that is, if there were no intervening blank spaces, the number of holes would vary from disc to disc in the manner indicated in the figure, in the case of discs 1 to 9, the largest number being 269 in the case of disc 1 and the smallest number being 239 in the case of disc 9. All of these discs may be driven with the same or slightly different peripheral speeds and the angular distance between adjacent holes is so chosen that the holes intercept the light beam at the rate of 500 times per second, assuming no blanks. Since the numbers of hole positions have no common factor, the discs 1 to 9 make a very large number of rotations before they all return to their original position. The synchronizing disc 10 has no blanks but a continuous row of holes. Disc 10, therefore, generates a continuous supply of 500-cycle per second pulses.

The photoelectric cells upon which the various light beams are incident are indicated at 40. Each of the first nine of these feeds (through an amplifier, if desired) to the grid of a gas-filled tube 41, the plate circuits of which are supplied in multiple with a pulsating voltage from disc 10. This voltage comes on 500 times a second and is interrupted in the intervening times. A bias voltage on the control grids is of such value that if a hole is presented to the light beam when the plate voltage pulse occurs the corresponding tube 41 fires and passes current through the output resistor 42. If on the other hand a blank is presented at the time the plate voltage pulse comes on, the corresponding tube 41 does not fire and no output voltage appears across resistor 42. For a fuller disclosure of the disc machine reference may be made to A. E. Melhose application Ser. No. 555,912, filed Sept. 27, 1944, which issued on June 24, 1975 as U.S. Pat. No. 3,895,799 which discloses and claims it.

This pulsing voltage supply comprises a source of rectified alternating current power at 30 for supplying a regulated direct current voltage across output resistor 31. The regulator includes series resistance tube 32 and its regulating control circuit 33 of known type, the control circuit 33 reacting on the grid potential of regulator tube 32 to vary the internal impedance of the latter in such manner as to maintain the current through resistor 31 constant. Tube 32 also acts as a current interrupter since its grid is driven highly negative 500 times per second from the photoelectric cell associated with disc 10, via rectifier 38 and rectifier bias circuit 39. This type of pulsing power supply can be used at the various points in the system where pulsing power supplied are indicated. The pulses can be readily displaced in time by including a phase shifter 31' and adjusting the phase delay at this point. This type of pulsing power supply is disclosed in the R. L. Miller application referred to above.

The nine leads emerging from the tubes 41 are carried through an interconnecting panel 45 for enabling various cross-sections to be made between the leads entering panel 45 from the left and those emerging from panel 45 at the right. It will be understood that in each of these nine leads there is an irregular series of off-on pulses (or marks and spaces) with a different pattern in the case of each lead. For example, these may occur in the order of mark space mark mark space mark mark space space, etc., to represent only a small portion of the series occurring on one conductor.

The top three conductors, marked group A, are carried to the right and through three "switches" to corresponding holding circuits H shown at 46. The next group of three leads, B, is shown partly by solid line and partly by broken line. The broken line portions lead to arrows adjacent the switches through which the A leads are carried. The significance of the arrows is that when pulses appear on the B leads the switches are actuated to one of their two positions shown and when spaces occur the switches are thrown to their alternative position. In considering this figure from a functional standpoint, these devices for determining whether an A conductor is to be connected to one or the other of the pair of holding circuits with which it is associated have been termed switches. It will be seen from the more detailed description to follow, however, that these elements are electronic in character and are, therefore, not moved from one position to another but are so controlled as to provide either one of two conductive paths.

The third or C group of leads extends to the right through three switches to the corresponding holding circuits 46.

Three ring circuits are indicated in the figure by dotted line enclosures at 47, 48 and 49. The first of these or the L ring contains five stages, the second or M ring contains seven stages and the third or N ring contains eight stages. The nature of these ring circuits will be fully disclosed hereinafter. These are constructed to "step" at the rate of 500 steps per second but in the sense that each tube in a ring initiates the operation of the next succeeding tube so that only one tube at a time in each ring is conducting. These rings, in addition to stepping from tube to tube in a closed cycle, also establish conductive paths as indicated by the separated arrow heads in the rectangular enclosures 47, 48 and 49. These conductive paths are established one at a time in each ring. The left terminals of these paths may be variously connected to the six conductors in the B and C groups as they emerge from the cross-connecting panel 45. The right-hand terminals E of these paths are shown extending through a cross-connecting panel 50 which is illustrated as having only six conductors extending to the right, although this panel has twenty input or E terminals from the L, M and N rings. These six output leads comprise three upper leads F shown as broken lines and three lower leads G. Each of the leads F is connected in parallel to two to five terminals of the E group while all terminals of the E group are effectively multipled with the three G leads. The F leads control the switches in the C conductors for determining which ones of the lowest six holding circuits H at 46 are to be connected at the moment to the respective C conductors.

The nature of the holding circuits H will be fully discloded hereinafter but for the purposes of the functional diagram of FIG. 1 the operation may be indicated by considering the uppermost pair of holding circuits. It will be assumed that a pulse on conductor 52 establishes connection between terminal 51a and terminal 53 and that absence of a pulse on conductor 52 establishes connection between terminal 51a and terminal 51. Each holding circuit has two output terminals, these being numbered 54, 55, 56 and 57 for the pair of holding circuits under consideration. The holding circuit is so constructed that if a pulse is produced on terminal 54 a space is produced on terminal 55 and vice versa. The same relation holds for terminals 56 and 57. When terminal 51*a* is in contact with terminal 51, for example, the existence of pulses and spaces on terminals 54 and 55 is determined by the pulses and spaces received over the upper A conductor from the disc. Assume at the instant when terminal 51*a* transfers over to terminal 53 that a pulse is on terminal 54 and, therefore, that a space is on terminal 55. This pulse and this space will remain on these two terminals until this holding circuit is again connected to and directively controlled over its A conductor. These circuits, therefore, act as holding circuits in that they maintain on their output terminals the same condition of pulse or space until they receive new controls from the discs. A series of switches 58 is indicated for connecting one of the pair of the output terminals of each holding circuit to the outgoing conductor.

The twelve holding circuits are connected in groups of four to the input sides of three reentry circuits 60, 61 and 62 which have a reentry value of 2 and multiples of 2, meaning that when the input consists of two pulses or four pulses they produce a space in the output circuit. An input of one pulse or three pulses produces a pulse in the output and an input of zero produces a space in the output.

It is clear that up to this point only two-valued pulses are dealt with in the system, one of the values being 0 and the other 1. The complications that have been resorted to are intended to make the appearance of pulses and spaces in the outputs of reentry circuits 60, 61 and 62 as nearly fortuitous as possible so as not to give any clue to the cyclic character of the disc generator circuit. Following the reentry circuits, stepping circuits are used to cooperate in converting from two-valued to multiple-valued pulses. The stepper circuit $S_1$ produces output pulses whose value is eitehr 0 or 1 unit. The stepper $S_2$ produces output pulses whose value is either 0 or 2 units. The stepper circuit $S_3$ produces pulses whose value is either 0 or 3 pulses. The pulses from these steppers are numerically added and impressed upon the reentry circuit 23 along the pulses from the other steppers to be described.

The three leads G are carried directly to the steppers $S_4$, $S_5$ and $S_6$ which produce output pulses, respectively, 0 or 1, 0 or 2 and 0 or 4 units, which are also supplied additively to reentry circuit 23.

In order to make the output pulses have a uniform distribution of the six values, auxiliary steppers $S_1$40 and $S_2'$ produce respectively output pulses 0 or 1 and 0 or 2 units, which pulses are added numerically to the output pulses of the other steppers. The steppers $S_1'$ and $S_2'$ produce zero output unless they receive an impulse over the respective lead 65 or 66 from the P ring containing six tubes. The P ring steps in a highly irregular manner under control of the nine coding discs, the arrangement being such that if a pulse appears simultaneously on three or more of the nine output leads A, B, C, the ring advances one step. When less than three pulses are present on all nine leads the P ring continues to remain in its previous position. This results in the P ring stepping about 91 percent of the time and failing to step in 9 percent of the pulsing times, in irregular manner. Each lead 65, or 66 is connected to a different pair of tubes in the P ring and these connections may be varied from time to time. The result is that lead 65 has an enabling voltage upon it for one-third of the time on the average and lead 66 also has an enabling voltage upon it for one-third of the time on the average. When stepper $S_1'$ is disabled, stepper $S_1$ alone fires in response to pulses from reentry 60 thus delivering output pulses of values 0 and 1 units. When stepper $S_1'$ is enabled, it fires with stepper $S_1$ and the two together deliver output pulses of values 0 and 2 units. Similarly, $S_2$ alone delivers pulses 0 or 2 and $S_2$ and $S_2'$ together deliver pulses 0 or 4. The effect is that the pulses from the reentries 60, 61 and 62 are converted one-third of the time to 0 or 1, 0 or 2, 0 or 3, respectively, another third of the time to 0 or 2, 0 or 2, 0 or 3, and the remaining third to 0 or 1, 0 or 4, 0 or 3, respectively. If the reentries 60, 61 and 62 deliver independent random pulses (and neglecting steppers $S_4$, $S_5$, $S_6$ and the message) this arrangement gives the same frequency of occurrence of each pulse value in the range 0 to 5 when taken over a considerable time interval, the occurrence of the individual pulse values being random.

It can be shown that when several component signals are added together and reentered, if one component has a random distribution the resultant will also have a random distribution no matter what is the character of the other components. This key generator can be thought of as generating several sets of signals, one of which is the true key (component having random-like distribution) and the others of which are "false messages" which are added to confuse the solution. The true key is generated by the upper six holding circuits operating from leads A, the reentries, steppers $S_1$, $S_1'$, $S_2$, $S_2'$ and $S_3$, and ring circuit P. The lower six holding circuits inject false messages into the two-valued signals entering reentries 60, 61 and 62, and the steppers $S_4$, $S_5$ and $S_6$ jointly inject a false message into reentry 23. The presence of the false messages makes the solution of the key enormously more difficult.

In accordance with a feature of the invention, the P ring is reset to zero whenever pulses appear simultaneously on all nine output leads from the discs. This assures that the failure of the P ring to advance will not permanently disarrange the code but will automatically be corrected in a period not exceeding a few seconds.

Steppers $S_4$, $S_5$ and $S_6$ may be considered as means for applying different biases to the pulse producing system comprising steppers $S_1$, $S_1'$, $S_2$, $S_2'$ and $S_3$, since they act to shift by 1, 2, or 4 units the base of the pulses produced by the steppers $S_1$ to $S_3$.

In the case of the rings L, M and N, since there are three ring circuits, from one to three of the six disc connected to conductor groups B and C may at any moment be connected in some fashion to leads G, sometimes as many as three discs being connected to one terminal, sometimes one disc being connected to all three terminals and sometimes three different discs being connected to the three terminals. If one or more discs energize a terminal of G, the connected stepper $S_4$, $S_5$ or $S_6$ is fired sending a pulse of magnitude 1, 2 or 4 into the key depending upon which stepper is fired.

These signals are added to those produced by the first described part of the circuit, at the input of reentry 23. Rings L, M and N are stepped regularly 500 times per second.

The cross-connecting panels 45 and 50 and the switches 58 permit changes to be made manually in the generated code from time to time in accordance with a schedule previously agreed on by operators at the different terminals. Also, as disclosed in the Melhose application, the discs can be individually shifted in phase from time to time and can be individually replaced by other discs with different hole patterns. Thus, mere possession of the equipment would not be sufficient to decipher messages, since it is necessary further to know the positioning of the various manual switches, apparatus adjustments, etc. before the secret key in use at any particular time can be produced.

Figure 2:
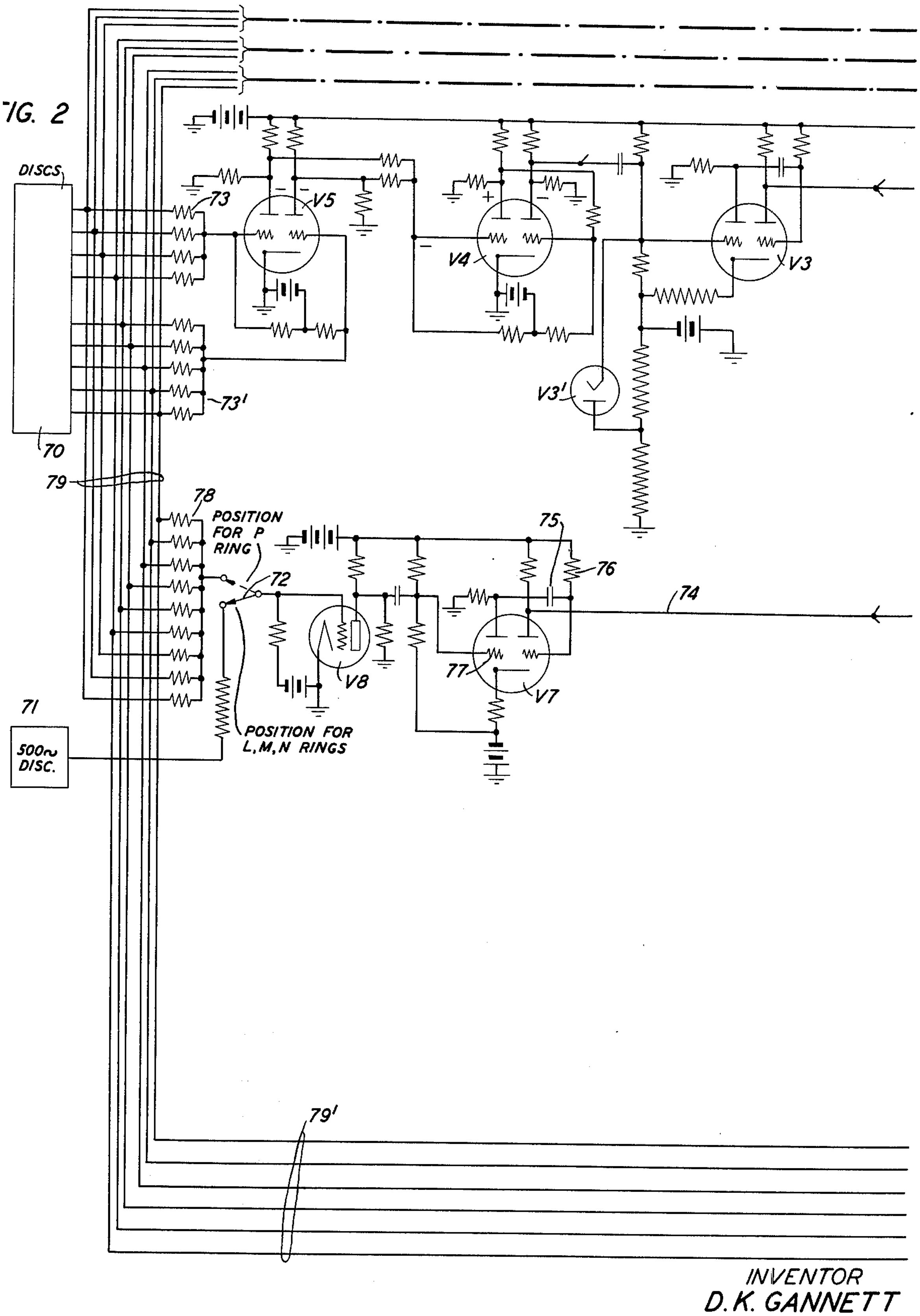
Figure 3:
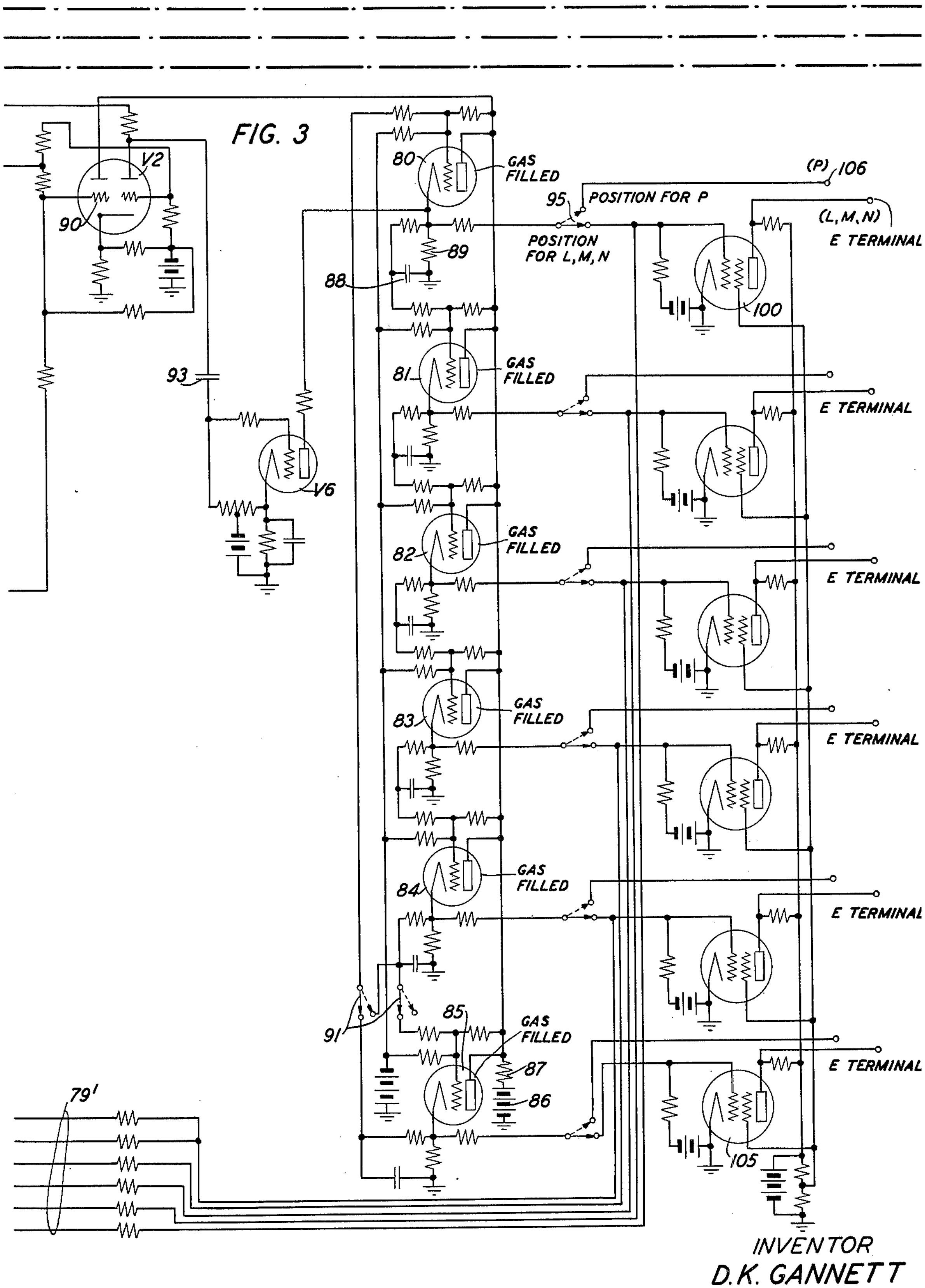

A description will now be given of the circuits for carrying out the functions of FIG. 1, with reference to FIGS. 2 to 6. Referring first to FIGS. 2 and 3, the nine discs are represented by the box 70 and the synchronizing disc is indicated at 71. The cross-connecting panels are omitted for clarity and the nine leads from the code pulse generating circuit are shown as branched and carried to different parts of the circuit. The row of tubes $V_2$, $V_3$, $V_4$ and $V_5$ are controlled from these nine leads which are shown connected through high resistances to the grids of tube $V_5$, as will be described more fully later on.

The complete circuit diagram of a ring circuit suitable for use as ring L or M or N or P is shown in FIG. 3 comprising (in the illustrated case) six tubes 80 to 85, although the number of tubes can readily be varied with the same plan of circuit. These are gas-filled tubes and they receive their anode voltage from battery 86 through a common resistor 87.

Assuming that tube 80 fires, in a manner to be described, a charge is placed on condenser 88 due to current flow through cathode resistor 89 and this charge applies a positive voltage to the otherwise negatively biased grid of the next tube, 81. Tube 81 is prevented from firing as long as tube 80 or any other tube in the ring is fired because the drop of potential across series resistor 87 reduces the grid voltage below the critical value. Tube 80 is restored at a definitely timed instant under control of tubes $V_8$, $V_7$ and $V_2$, by the application (in a manner to be described) of a positive voltage to the grid 90 of tube $V_2$ which passes saturation current and draws enough additional current through series resistor 87 to cause the plate voltage of tubes 80 through 85 to be driven below zero and thereby cause tube 80 to restore. In the case of rings L, M and N which step 500 times a second, the switch 72 in the input of tube $V_8$ of FIG. 2 is in its lower position and applied 500-cycle per second pulses from disc 71 to the grid of this tube. Tube $V_8$ being connected via $V_7$ of FIG. 2 to $V_2$ of FIG. 3, this results in applying to the grid 90 of tube $V_2$ voltages which cause alternately zero and saturation current to flow through the left half of tube $V_2$. When this current drops to zero in the next half cycle after tube 80 was restored, tube 81 fires since the charge on condenser 88 has not had time to leak off to the point where the voltage on the grid of tube 81 is below its firing value. In this way, as long as tube $V_2$ continues to pass 500-cycle pulses with intervening interruptions, the ring circuit is caused to advance one step upon each interruption, each tube of the ring preparing the next tube for firing.

The disc 71 applies positive pulses to the grid of tube $V_8$ whenever a hole in the disc is reached. At other times tube $V_8$ is cut off due to grid bias. The right-hand half of tube $V_7$ is normally passing saturation current and applying negative voltage to conductor 74 which is branched to three tubes like $V_2$, one for each of the rings L, M and N. Tube $V_7$ is a single-trip multivibrator with a time constant dependent upon the proportioning of condenser 75 and resistor 76. When tube $V_8$ receives a positive pulse on its grid, it sends a voltage transient to the grid 77 of tube $V_7$ which has no effect, but the opposite transient that is set up by the cutting off of current through tube $V_8$ throws grid 77 to positive potential causing current to increase through the left half of tube $V_7$ which in turn cuts off current in the right half which, therefore, applies positive voltage to conductor 74. The duration of this positive voltage is controlled by the time constant of the circuit of tube $V_7$ to be very short, about a quarter of a millisecond as indicated on the timing diagram of FIG. 8 graph IV where the first advance interval is shown as occurring between the times 0.65 and 0.88 millisecond. Tube $V_7$, therefore, returns to its first assumed condition will before the next 500-cycle pulse is applied from the disc to tube $V_8$.

In this way the tube of the ring circuits L, M and N are caused to step regularly at 500 steps per second. A switch is introduced at 91 in the ring circuit to indicate that the number of tubes in a ring can be readily changed. When switch 91 is in the full line position shown, all six tubes are in the ring. When the switch is in its alternate position the stage 85 is cut out and the ring consists of only the five tubes 80 to 84.

In the case of the P ring the switch 72 in the grid circuit of tube $V_8$ is in its upper position connecting the grid through high resistors 78 to all nine leads 79. The bias on the grid of tube $V_8$ is so proportioned that tube $V_8$ is biased to cut off so long as no pulse exists on any lead in group 79 or so long as a pulse is present on only two leads. If a pulse is on each of three or more leads at the same time, the grid of tube $V_8$ has its voltage thrown far enough positive to cause saturation current to flow. The high resistors 78 cause the pulse voltages to be additive on the grid of tube $V_8$. At the end of the pulse representing the summation of these three or more pulses, tube $V_7$ operates as before to apply a short pulse to grid 90 of tube $V_2$ causing the ring to advance.

The tubes $V_3$, $V_4$ and $V_5$ are associated with the resetting of the P ring when all nine discs produce pulses at the same instant. Tubes $V_2$ and $V_6$ also participate, tube $V_6$ restarting the ring. The ring is stopped from taking any further steps by application of a long pulse to the left-hand grid of tube $V_2$. This pulse is long enough to allow the charge on the interstage coupling condenser, such as 88, of the ring circuit to leak off and prevent restarting at the point where the ring left off stepping. Tube $V_6$ operates to apply a starting pulse to the first tube 80 of the ring so that tube 80 will fire when $V_2$ next permits the plate voltage to rise to normal firing value.

Going over the circuit more in detail, tube $V_5$ is cut off except when its left grid is supplied with four pulses together and its right-hand grid is at this same time supplied with five pulses, tube $V_5$ then passing saturation current through both halves. This division of the nine connections into two groups provides an easier operating margin for the tube than as if all nine conductors were applied to one grid. When the nine simultaneous pulses occur, a negative voltage is applied to the left-hand grid of tube $V_4$ causing the left half of this tube to cut off, this half of tube $V_4$ being normally biased to transmit saturation current. The right-hand half of tube $V_4$ now transmits current and upon the cessation of the nine simultaneous pulses, tube $V_4$ applies a positive pulse to the left-hand grid of tube $V_3$. This tube is a single-trip multivibrator similar to tube $V_7$ but its constants are adjusted to have a much longer time constant and to produce a long pulse. Tube $V_3$, therefore, drives both grids of tube $V_2$ positive for a relatively long interval. The saturation current through the left half of tube $V_2$ restores the operated tube in the ring circuit and holds all ring tubes restored long enough for the last of the charged condensers 88, etc. to dissipate its charge. At the end of this long pulse, both halves of tube $V_2$ are cut off. The cessation of current through the right half of tube $V_2$ sends a short pulse of positive voltage through condenser 93 to the grid of tube $V_6$ causing that tube to conduct for a brief instant and to send a short negative pulse to the cathode of tube 80, the first tube of the ring. This is equivalent to impressing a positive pulse on the grid and causes tube 80 to fire, since its plate voltage is now at maximum value, after which the advancing of the ring can occur as before but beginning with the first tube of the ring instead of with the next tube after the last tube that fired. From the timing chart, FIG. 8, lowest graph, it is noted that one step is skipped in the reset process.

The diode $V_3'$ is provided in shunt to the control grid circuit of tube $V_3$ to prevent false operation in case all nine discs fire twice in successive time intervals. At the start of the second such pulse the right half of tube $V_4$ would, as in the case of the first pulse, apply a negative voltage to the control grid of tube $V_3$ which would restore this tube except for the action of diode $V_3'$. Tube $V_3'$ offers a low shunt impedance to this negative pulse and prevents it from restoring tube $V_3$. Tube $V_3$ must not be restored in this way since it is supposed to apply a long pulse to the grids of tube $V_2$ as and for the purpose described. Diode $V_3'$ is poled so as not to interfere with the placing of positive pulses upon the control grid of tube $V_3$.

The resetting feature has been described in connection with only the P ring. It is comtemplated, however, that the reset feature may also be used in the case of the L, M and N rings so as to automatically synchronize those rings at the different stations. The drawing, therefore, shows the tubes $V_3$, $V_4$ and $V_5$ connected in circuit for the L, M and N as well as for the P ring.

Switches 95, etc. are shown in the output leads from the ring circuit tubes for switching the outputs either to the control grids of the output pentode tubes 100 to 105 in the case of the L, M and N rings (switch position shown) or directly to a set of output terminals 106, etc. in the case of the P ring (alternate switch position). The output or load voltage from the ring circuit is taken from the cathode resistors 89, etc. which gives a positive voltage when a tube is fired and zero voltage when a tube is not fired. The voltages impressed on the E terminals from the plates of the output pentodes are highly positive at all times except when the corresponding pentode is conducting saturation current and at such times the voltage is positive but small and approaching zero. The positive voltage applied to the grid of one of the output pentodes 100 to 105 when the corresponding ring tube fires is just sufficient to bring the tube up to near the beginning of its transmitting range but not to cause it to conduct. It requires a positive pulse coming in on one of the six conductors in the group 79' from the discs to swing the grid voltage of an output pentode tube through its characteristic into its saturation range. The L, M or N ring circuit and output pentodes operate as a switch to permit a pulse if present on one of the conductors in group 79' to alter the voltage on the corresponding E terminal from high positive to substantially zero value.

Figure 4:
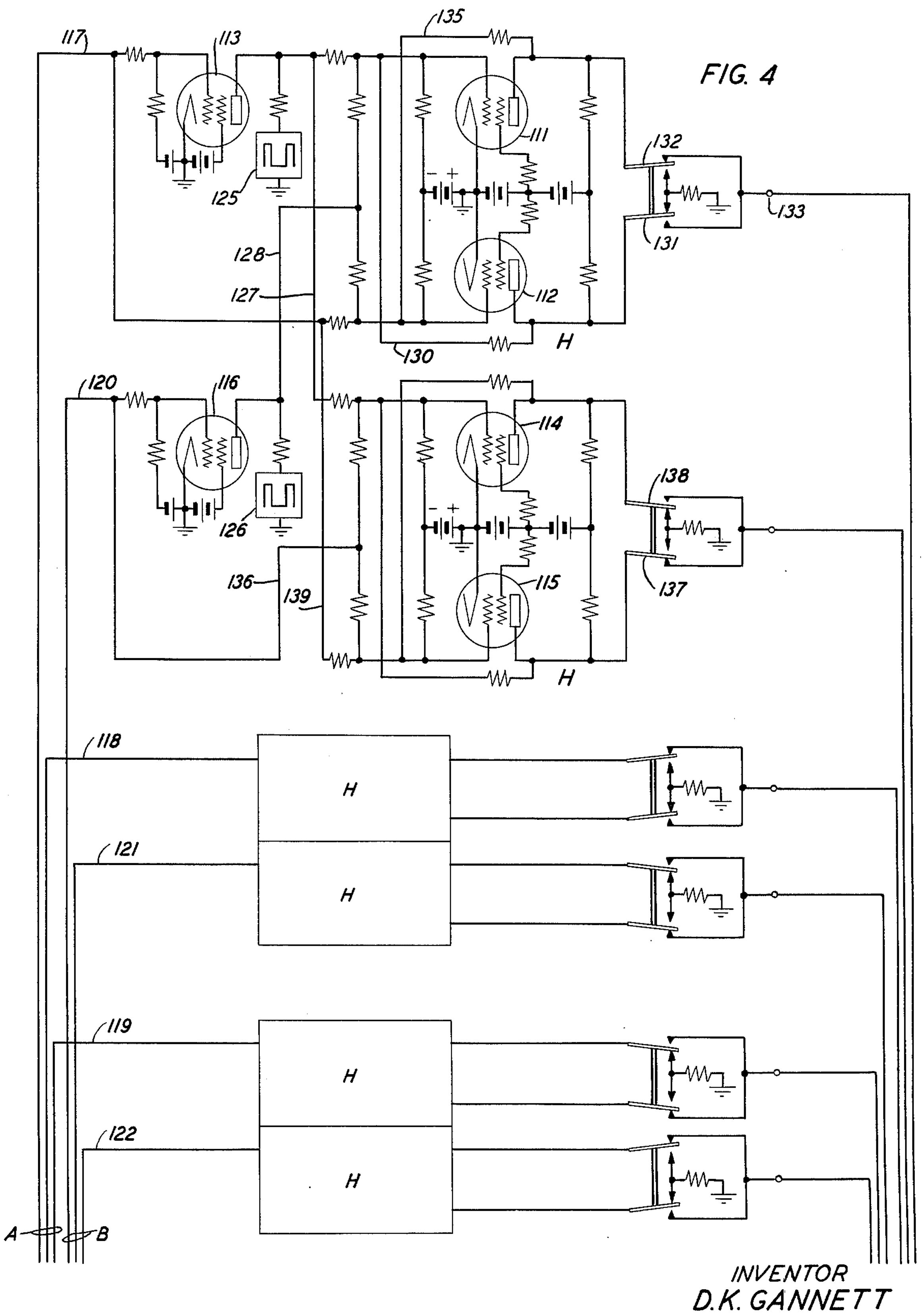

Referring now to FIG. 4, the nature of the H circuits and of their switches will be described. In this figure are represented the upper three pairs of H circuits of FIG. 1 and their controlling circuits. The uppermost H circuit comprises the pair of high vacuum tubes 111 and 112 and the other H circuit of this pair comprises similar tubes 114 and 115. The switching tubes are high vacuum tubes 113 and 116. The three A leads are shown coming in at 117, 118 and 119 and the three B leads at 120, 121 and 122. As previously stated the voltage on each of these leads may have either of two values, zero or a positive value which may, for example, be 100 volts.

If there is a pulse on lead 117 and no pulse on lead 120, the pulsing supplies indicated at 125 and 126, which apply positive voltages to the plates of the switching tubes simultaneously with the receipt of pulses over the A and B leads from the discs, cause the voltage on conductor 127 to have a low (nearly zero) value and the voltage on conductor 128 to be high (e.g. + 200 volts). The positive voltage on lead 128 enables both tubes 111 and 112 by opposing their normally negative control grid voltage. Tube 112 has its grid voltage driven still further positive by the pulse received over lead 117 and transmits saturation current, reducing its plate voltage to near zero. The cross feedback over lead 130 lowers the grid voltage of tube 111 so far as to reduce the space current through that tube to near zero, making its plate voltage high. Under these conditions, substantially ground potential appears on switch spring 131 and a high positive voltage appears on switch spring 132. Either of these voltages can be selected for application to the output terminal 133 by putting the switch consisting of springs 131 and 132 in one position or the other. This voltage condition on the plates of tubes 111 and 112 will continue the same until the circuit is switched over from tube 112 to 111 by received pulses. In order to switch the circuit over it it necessary to apply an enabling voltage to the tubes 111 and 112 and a positive pulse to the grid of tube 111. These two conditions are met by the absence of a pulse on both conductors 117 and 120 at the instant when the pulsing power sources 125 and 126 apply positive voltage to the switching tube anodes. Absence of a pulse on lead 120 results, as before, in application of an enabling voltage over lead 128 to the grids of tubes 111 and 112. Absence of a pulse on lead 117 results in application of high positive voltage from the plate of tube 113 to the grid of tube 111 causing that tube to transmit saturation current and cut off tube 112 by the feedback over lead 135.

The presence of a pulse on conductor 120 enables tubes 114 and 115 over lead 136. Also tube 116 transmits saturation current and applies substantially zero voltage to conductor 128 so that tubes 111 and 112 are not enabled. If there is at this time no pulse on conductor 117, tube 114 transmits saturation current due to the high voltage on conductor 127, and tube 115 is cut off. This applies a positive voltage to switch spring 137.

If, instead, there were a pulse on conductor 117 as well as on conductor 120, tube 113 allows negative voltage to be applied to the grid of tube 114 but the grid of tube 115 is thrown positive by the pulse on conductor 117 and 139. Tube 115 then transmits saturation current and tube 114 is cut off. Positive voltage is then applied to switch spring 138.

The other H circuits in FIG. 4 are individually controlled in similar manner over respective A conductors 118 and 119 and B conductors 121 and 122.

Figure 5:
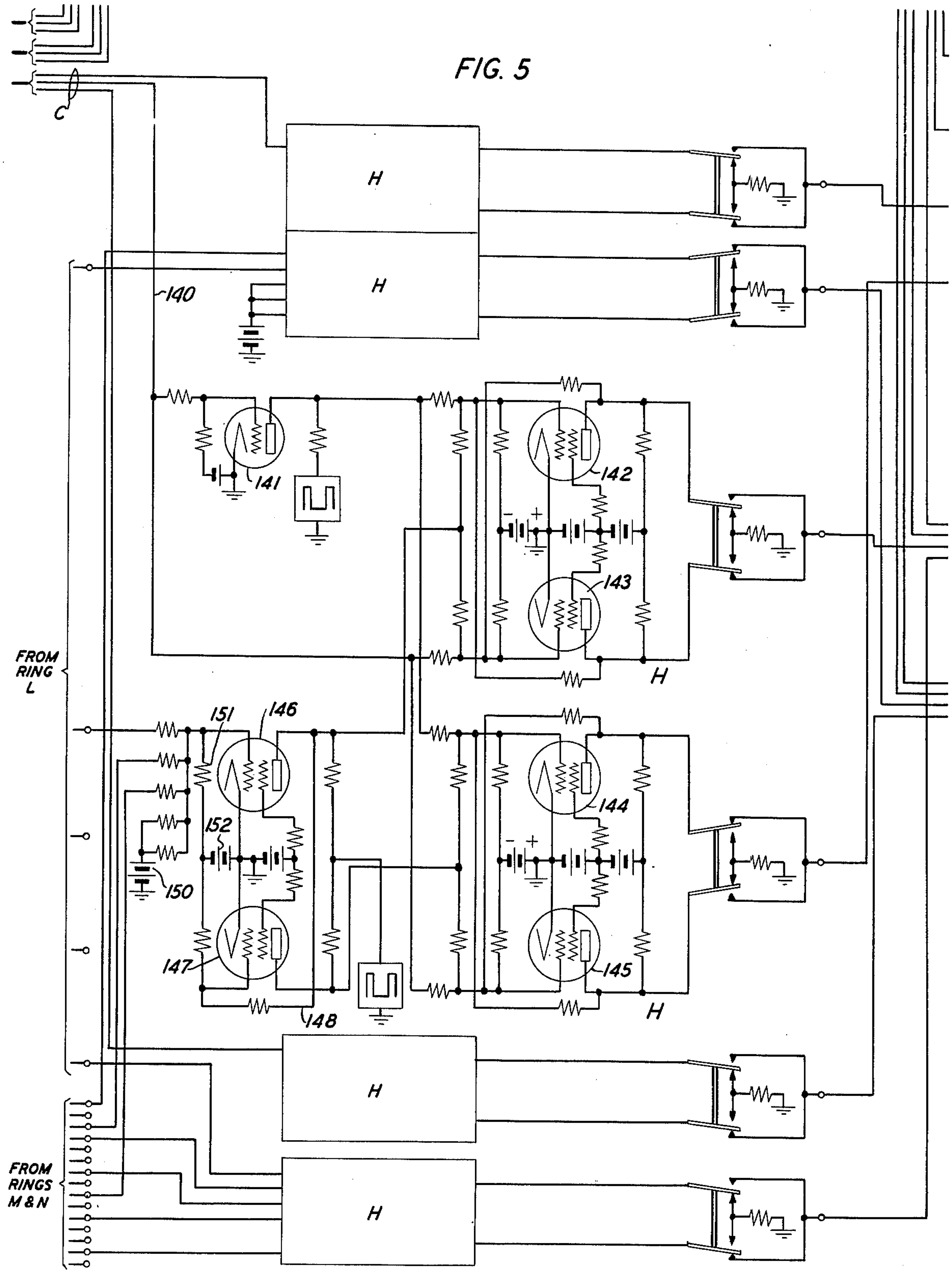

The remaining six holding or H circuits are shown on FIG. 5 with their control circuits. These are also in three pairs, the upper and lower pairs being shown by boxes and the central pair drawn out. Considering this latter pair, the C conductor 140 is connected through series resistors to the grids of tubes 141, 143 and 145. A pair of switching tubes are used at 146 and 147 with a cross connection 148 for cutting off tube 147 whenever tube 146 is transmitting full space current. The grid of tube 146 is connected in parallel to five high resistors the opposite ends of which may be variously connected to a group of the E terminals of rings L, M and N with two to five E terminals in a group. As shown, three of the high resistors are so connected, and from considering the E terminals on FIG. 3, it is noted that when the corresponding output pentode 100 to 105 is cut off (as normally) a high positive voltage exists on the E terminal. This voltage may be, for example, 200 volts. When one E terminal voltage drops to nearly zero due to the corresponding pentode transmitting saturation current, a reduction of approximately 40 volts in the applied voltage occurs on the grid of tube 146. If two of the five connected E terminals have their potential lowered to near zero, a reduction of approximately 80 volts occurs in the applied potential of grid of tube 146. Where, as shown, two of the high resistors are unconnected to E terminals, a 200-volt battery 150 is connected to these two. The relation between the parallel resistors in the grid circuit of tube 146, and of resistor 151 and bias battery 152 is such that when none of the E terminals of the L, M or N output pentodes, to which the grid resistors in the grid circuit of tube 146 are wired, is transmitting current, the applied voltage on the grid circuit of tube 146 is sufficiently positive to cause the tube to transmit saturation current. When one of these particular output pentodes is transmitting, however, the consequent 40-volt reduction in applied grid voltage is sufficient to cut off the tube 146. If two of this particular group of output pentodes both transmit current at the same time, this has no further effect since tube 146 is cut off by saturation current through one output pentode alone.

So long as tube 146 is in transmitting condition, tube 147 is cut off and its high plate voltage enables tubes 144 and 145, of which tube 144 transmits if no pulse is on conductor 140, while tube 145 transmits if a pulse is present on conductor 140. If tube 146 is cut off, in the manner described, tube 146 is conducting, and an enabling voltage is applied to tubes 142 and 143 from the plate of tube 146. Absence of a pulse on lead 140 causes tube 142 to conduct while presence of a pulse on lead 140 causes tube 143 to conduct.

The manner of operation of the other holding or H circuits shown on FIG. 5 will be clear from the description that has been given of the central pair of H circuits.

Figure 6:
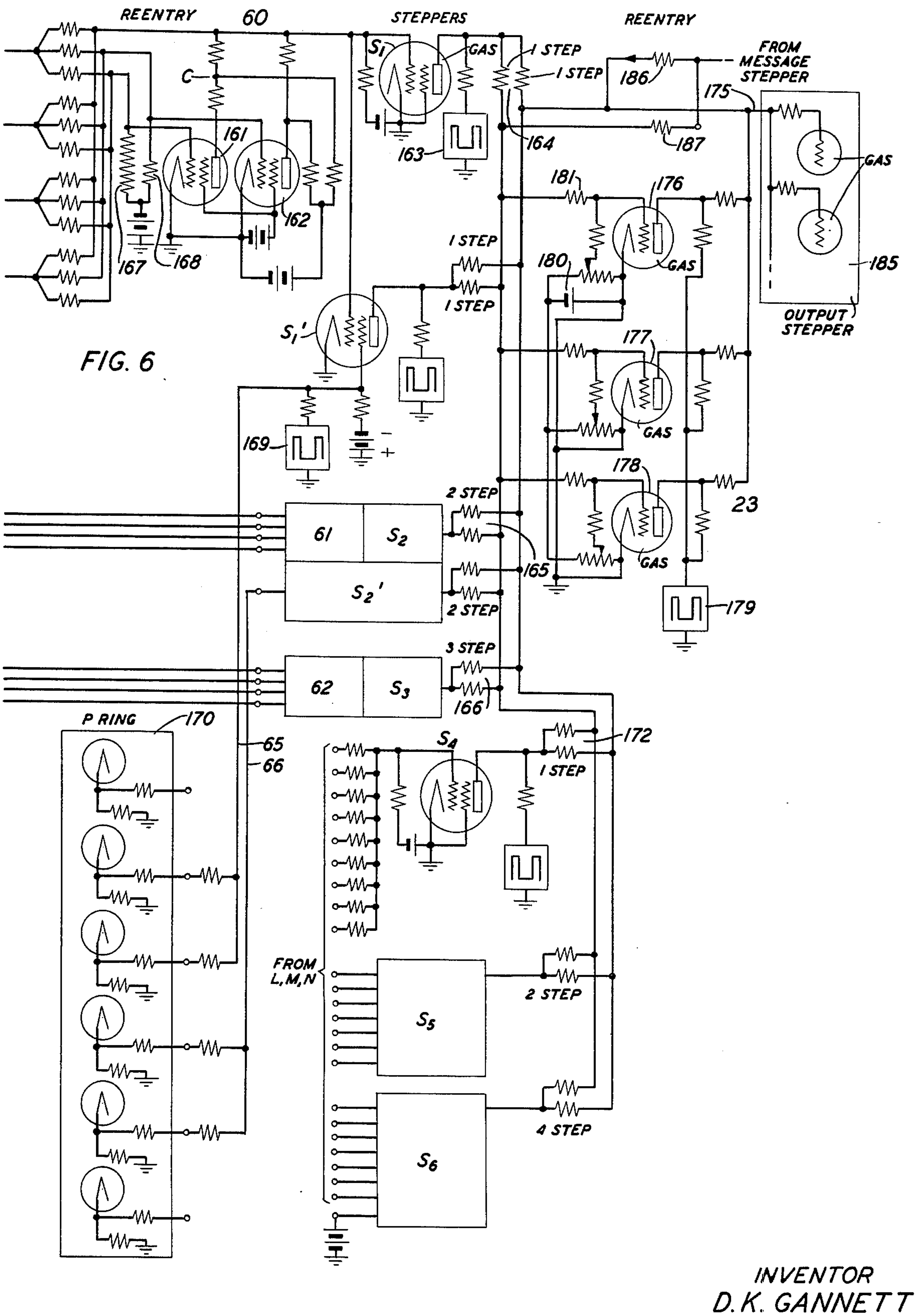

The reentry circuits are shown in FIG. 6. As indicated in FIG. 1, the H circuits are connected in groups of four to each of three reentry circuits 60, 61 and 62. In FIG. 6, reentry 60 is drawn out while reentries 61 and 62 are shown as boxes. The four leads brought to each reentry input include high resistances in the multiple branches for producing voltage additions on the control grids of each of the reentry tubes 161 and 162. Normally neither tube is in conducting conditon due to high negative grid bais.

If a positive pulse exists on the output terminal of only one H circuit connected to reentry 60, this voltage breaks down gas-filled stepper tube $S_1$ when the pulsing power supply 163 drives its plate positive, causing substantially zero voltage to be applied to reentry 23. If two H circuits apply positive pulses to reentry 60, the bias on the grid of tube 161 is made high enough by the drop through resistor 167 to cause that tube to transmit saturation current which results in swinging the grid potential of tube $S_1$ in the negative direction sufficient to prevent $S_1$ from firing. The pulsing supply then transmits a positive pulse to reentry 23. If three H circuits apply positive pulses at the same time to reentry circuit 60, the negative bias effect produced on tube $S_1$ due to saturation current in tube 161 is overcome by the sum of the three pulse voltages applied to the grid of tube $S_1$, which fires and applies zero voltage to the reentry 23. If four positive pulses are received from all four H circuits, the voltage drop in resistor 168 is great enough to allow tube 162 to conduct, tube 161 also conducting due to drop in the still larger resistor 167. Both tubes 161 and 162, therefore, transmit saturation current, resulting in applying a negative bias to the grid of tube $S_1$ sufficient to prevent it from firing, and a positive pulse is impressed on reentry 23.

The amount of the positive voltage that is applied to reentry circuit 23 from stepper tube $S_1$ is determined by the series resistors 164. These are proportioned to cause $S_1$ to supply one step of voltage to reentry 23 when tube $S_1$ does not fire. At other times zero voltage is supplied from $S_1$.

Reentry 61 and stepper $S_2$ operate in similar manner except that the series resistors 165 are in this case proportioned to apply two steps of voltage to reentry 23. Reentry 62 and stepper $S_3$ similarly apply zero and three steps of voltage, resistors 166 being suitably proportioned.

The six tubes of the P ring are indicated at 170 as having one pair of output terminals connected to conductor 65 and another pair to conductor 66. When one tube of one of these pairs fires, positive voltage is applied over lead 65 or 66 to the screen grid of auxiliary stepper $S_1'$ or $S_2'$. The effect of this, assisted by the pulsing voltage from 169, is to enable the auxiliary stepper so that in case the main stepper $S_1$ or $S_2$ fires, the auxiliary stepper $S_1'$ or $S_2'$ also fires. These auxiliary steppers supply 0 or 1 and 0 or 2 steps of voltage, respectively, to reentry 23.

The steppers $S_4$, $S_5$ and $S_6$ each fire each time their pulsing power supply applies a positive voltage pulse to the plate unless the firing of the tube is prevented by the flow of saturation current through one of the output pentodes of one of the rings L, M or N to which the grid of the stepper is multiple wired through parallel high resistors. The series output resistors 172, etc. are so proportioned that stepper $S_4$ supplies 0 or 1 step to reentry 23, stepper $S_5$ supplies 0 or 2 steps and stepper $S_6$ supplies 0 or 4 steps.

One branch output of each stepper is connected through voltage adding resistors to the input grid terminal 175 of the output stepper 185 and the other branches are connected in common to control grids of the gas tubes 176, 177 and 178 of reentry circuit 23. A pulsing supply 179 is provided for the plates of these three tubes. A bias battery 180 supplies graduated bias voltages to the grids of these three tubes through individual potentiometers. These are shown as set to give the least negative bias to the grid of tube 178, and successively larger biases to tubes 177 and 176, respectively. High series resistors 181, etc. serve to make the voltages received from the steppers additive on the grids of tubes 176 to 178. The highest stepper voltage corresponds to step 0, so reentry tubes 176 and 178 are fired on steps 0 to 5, and they fail to fire on step values equal to or higher than 6, 12 and 18, respectively.

The maximum number of steps which the key steppers can apply at one time to reentry 23 is 15 steps. The message varies from 0 to 5 steps so that the total range of message plus key values extends from 0 to 20 steps. The message pulses are supplied to the grids of tubes 176 to 178 through high resistor 187 and to the grid terminal 175 of the output stepper through high resistor 186.

The reentry circuit is set to reenter at step values of 6, 12 and 18 so that the maximum step value of 20 is transmitted as step 2. At step 6 and higher values, the stepper voltage is so low that the bias on tube 176 is sufficient to prevent that tube from firing, thus increasing grid voltage applied to stepper input terminal 175 by the equivalent of six steps. Thus at step 6 step 0 is transmitted. At step 12 and higher values, both tubes 176 and 177 fail to fire adding twelve steps of voltage to the input terminal 175. At exactly step 12 this results in transmitting step 0. At step 18 and higher, all three tubes 176 and 178 fail to fire, increasing the input to terminal 175 by 18 steps.

It has been assumed for simplicity that the same reentry 23 would be used for either type of key. This would probably be feasible even though there need be but one reentry point, at step 6, for the key obtained from the record. In this case reentry tubes 177 and 178 would simply perform no function and could be removed from their sockets if the plate and cathode terminals were connected together. Alternatively, a single-tube reentry circuit could be provided for use with recorded key as in Miller's application and could be substituted for the multiple reentry circuit of FIG. 6 when switching over to recorded key.

The output stepper 185 may be the same as the output stepper in Miller's application. It would contain five gas-filled tubes differently biased to fire at successively higher input voltage and supplied with pulsing plate voltage to provide pulses of 1.5 milliseconds length with intervening 0.5-millisecond spaces.

FIG. 8 represents a possible timing relationship by way of example. Graph I is the plate voltage pulsing supply for the stepper tubes $S_1$ to $S_6$ and for the message stepper 22 of FIG. 1, as well as for the key stepper 29 when that is used. Graph II is for the reentry power supply at 179. The off intervals of the steppers, graph I, could also be of half-millisecond duration, extending from 0 to 0.5 millisecond, etc., if desired. Graph III is for the power supplied to the gas tubes 41 of FIG. 1. The ring circuits L, M and N advance just after the cessation of the disc pulses and the ring tubes that have fired remain conducting until the end of the next succeeding disc pulse. The output pentode for these ring circuits are conditioned for transmission of dics pulses as soon as the rings advance, at the times indicated by legends on graph IV. Ring tubes which fired in the first of the indicated advance intervals condition the corresponding output pentodes for transmission at time 0.88 millisecond or an instant later. By the time the next disc pulse comes on, at time 2.15 milliseconds, these tubes have had plenty of time to settle down in readiness to transmit the disc pulse. This disc pulse must come on at a time when the steppers are momentarily off (graph I) and must be maintained until after the steppers are reenergized. In other words, the pulses in graph III must overlap the beginnings of the pulses in graph I. The reentry tubes must come into action after the steppers have had time to operate but well before the ends of the stepper pulses. The graph (not shown) for the output stepper supply would look like graph I but would be shifted so that the off periods overlap the initial parts of the pulses of graph II. Then the output stepper will produce a pulse during the time when the reentry pulse is on, e.g. at time 1.55 milliseconds, and hold the pulse for 1.5 milliseconds until just before the next reentry pulse occurs.

What is claimed is:

1. A system for producing multivalued pulses having a substantially random distribution of magnitude with time, comprising means to produce simultaneously several independent series of two-valued pulses having the same pulse rates, said series occurring in cycles of different respective lengths, a lesser number of reentry devices having reentry points such as to produce two-valued output pulses, means to supply the pulses of certain series individually to the respective reentry devices, means to group others of said series of pulses and to apply each group to a different one of said reentry devices together with the pulses from said certain series, means controlled by pulses in some of said series to vary the grouping of said others of said series and their application to said reentry devices, and means to combine the outputs of said reentry devices into multivalued pulses.

2. The invention claimed in claim 1 including stepper circuits following said reentry devices and producing respectively different output step values.

3. The invention claimed in claim 1 including stepper circuits following said reentry devices and producing respectively different output step values, a common reentry device, and means to apply the pulses from all of said steppers to said common reentry device, said latter device having a reentry point which is a multiple value of the reentry point of said first-mentioned reentry devices.

4. The method of producing a long non-recurring series of pulses varying in amplitude from pulse to pulse in highly irregular manner comprising generating a plurality of recurrent primary series of two-valued pulses, each series having a different length from the others, using a plurality of said primary series of pulses to conjointly determine intermediate series of two-valued pulses, using others of said primary series of pulses to vary the primary series conjointly determining individual pulses of the intermediate series, and differently weighting said intermediate series of pulses to produce said long non-recurring series of pulses varying in amplitude.

5. In a pulse generating system, means to produce separate irregular series of two-valued pulses, separate respective circuits therefor, holding devices adapted for connection to certain of said circuits, each holding circuit capable of storing a pulse received from the corresponding circuit, means controlled by pulses in other of said circuits for operatively dissociating a holding device from one of said certain circuits and operatively associating another holding device with said one circuit, and means for combining pulses in a dissociated holding device with pulses in an associated holding device.

6. In a pulse generating system, means for producing irregular pulses in each of a number of separate circuits, an output for each of said circuits, a pair of holding devices for each of said circuits, means for connecting said holding devices one at a time to their respective circuits and means for combining pulses impressed on each of said outputs from said several circuits with other pulses from a corresponding one of said holding devices.

7. In a pulse generating system, separate pulses producing means, separate transmission paths for the pulses produced thereby, a common combining circuit for pulses transmitted over said paths, means in individual paths for differently weighting the amplitudes of the pulses therein, and means controlled by certain of the produced pulses for altering the weighting given to the pulses in the individual paths.

8. The invention claimed in claim 7 in which said last means includes a distribution circuit for applying control energy to different weighting means at different times and means to actuate said distributor circuit to shift the application of control energy from one weighting means to the next.

9. In a pulse generating system, a plurality of separate pulse generating means, a common output circuit for pulses from a plurality of said pulse generating means, a plurality of means for adding other pulses in said common output to the pulses from said plurality of pulse generating means, a selector circuit for selecting among said plurality of pulse adding means, and means controlled by pulses from a plurality of said pulse generating means for actuating said selector circuit.

10. The combination claimed in claim 9 comprising means actuated by simultaneous pulses in more than two of said pulse generating means for actuating said selector circuit.

11. The combination claimed in claim 9 in which said selector circuit has a zero position and means actuated by simultaneous pulses in all of said pulse generating means for resetting said selector circuit to zero position.

12. In a key producing system, a utilization circuit, a plurality of individual pulse generators, a circuit leading from each, a pair of holding devices for each terminal of certain of said circuits, each device having an output, means controlled by pulses in others of said circuits to determine whether one or the other of the pair of holding devices is enabled to receive pulses from the respective certain circuit, the other holding device of the pair maintaining on its output terminal the pulse last received over the respective certain circuit, and means to combine the pulses in the outputs of both devices of a pair for application to said utilization circuit.

13. In a pulse generating system, a plurality of sources of irregular sequences of two-valued pulses, separate circuits leading from said respective sources, a corresponding plurality of output terminals, pairs of holding circuits inserted between said separate circuits and said output terminals for impressing pulses upon respective output terminals, means for operatively associating the input side of each holding circuit with or dissociating it from a respective circuit in irregular time order, each holding circuit on its output side remaining continuously in operative relation with a respective output terminal, each holding circuit when its input side is dissociated from its respective circuit continuing to impress upon its respective output terminal the same pulse value that it was caused to impress upon such output terminal when its input side was last associated with its respective circuit, and means to cause each holding circuit when its input side is operatively associated with its respective circuit to impress upon its output terminal a pulse whose value is determined by the pulse that is present in said circuit.

14. In a pulse generating system, separate input circuits carrying irregular sequences of two-valued pulses, a pair of holding circuits for each input circuit, each holding circuit having an input connection and an output connection, other input circuits carrying irregular sequences of two-valued pulses, means controlled from said other input circuits for operatively associating the input connections of said holding circuits individually with, or dissociating said input connections from, said input circuits, output circuits connected to respective holding circuits at their output connections, means to cause each holding circuits to transmit into its respective output circuit pulses received from an input circuit with which the input connection of the holding circuit is operatively associated, and means to cause each holding circuit to continue to transmit into its respective output circuit when its input connection is dissociated from an input circuit the pulse value last received from an input circuit by said holding circuit.

15. In a pulse generating system, means to produce in separate circuits separate irregular series of pulses each having one of a definite number of amplitude values, said pulses being of equal pulse period, a common output for all of said pulses, holding circuits inserted between said separate circuits and said common output, means included in each holding circuit to enable it to hold over a pulse into a subsequent pulse period and means for impressing upon said common output pulses currently received from certain of said separate circuits and pulses held over from previous pulse periods by one or more of said holding circuits.

16. In a key generating system, a plurality of separate sources of irregularly occurring two-valued pulses having either zero value or one unit of pulse strength, means for variously combining pulses from said separate sources in different manners in time succession to produce resultant combination pulses simultaneously occurring in three separate circuits, said latter means including control circuits for automatically varying the manners of combining said pulses in irregular sequences, a common output for receiving summations of the resultant combination pulses in said three separate circuits, said control circuits including means for substantially uniformly distributing over long periods of time the pulse values of said summation pulses by causing the resultant combination pulses to have for one-third of the time on the average the values zero or one unit, zero or two units and zero or three units in the respective three circuits, and to have for another one-third of the time on the average the values zero or two units, zero or two units and zero or three units in the respective three circuits and to have for the remaining one-third of the time on the average the values zero or one unit, zero or four units and zero or three units in the respective three circuits.

17. In a pulse generating system, means to produce separate irregular series of two-valued pulses, means to hold over certain of said pulses for irregular lengths of time, means under control of said pulse producing means and said pulse holding means to provide irregular series of two-valued output pulses and means under the joint control of a produced pulse and one of said pulses that have been held over for irregular lengths of time for determining whether the output pulse has one or the other of its two possible values.

18. In a pulse generating system, separate sources each producing a different series of irregularly occurring two-valued pulses, means to hold over certain of said pulses for different times, means controlled by said sources and said holding-over means to provide irregular series of two-valued output pulses, means controlled by certain of the produced pulses to determine the length of time said certain pulses are held over, and means to combine one of said produced pulses with one of said held-over pulses to produce one of said output pulses.

* * * * *